(12) United States Patent
Lai et al.

(10) Patent No.: US 6,512,317 B2
(45) Date of Patent: Jan. 28, 2003

(54) MOTOR USING PERMANENT MAGNET ROTOR

(75) Inventors: Ching-Feng Lai, Hsinchu (TW);
Yu-Choung Chang, Hsinchu (TW);
Tse-Liang Hsiao, Hsinchu (TW);
Chun-Chung Yang, Hsinchu (TW);
Kun-I Liang, Hsinchu (TW); Ann Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/745,465

(22) Filed: Dec. 26, 2000

(65) Prior Publication Data

US 2002/0079768 A1 Jun. 27, 2002

(51) Int. Cl.$^7$ ............................................... H02K 21/12
(52) U.S. Cl. .......................... 310/156.57; 310/156.53; 310/156.56
(58) Field of Search .......................... 310/216, 42, 261, 310/156.38–156.46, 156.53, 156.56, 156.57; 29/596–598

(56) References Cited

U.S. PATENT DOCUMENTS

| | | | | |
|---|---|---|---|---|
| 4,973,872 A | * | 11/1990 | Dohogne | .................... 310/156 |
| 5,113,104 A | * | 5/1992 | Blaettner et al. | .............. 310/90 |
| 5,757,108 A | * | 5/1998 | Suzuki | ...................... 310/49 R |
| 6,002,191 A | * | 12/1999 | Saban | ......................... 310/216 |
| 6,025,667 A | * | 2/2000 | Narita et al. | ................. 310/156 |
| 6,144,131 A | * | 11/2000 | Hollenbeck et al. | ......... 310/156 |
| 6,208,054 B1 | * | 3/2001 | Tajima et al. | ................ 310/156 |
| 6,242,837 B1 | * | 6/2001 | Matsunobu et al. | ......... 310/216 |
| 6,329,734 B1 | * | 12/2001 | Takahashi et al. | ...... 310/156.56 |

* cited by examiner

*Primary Examiner*—Tran Nguyen
(74) *Attorney, Agent, or Firm*—Troxell Law Office PLLC

(57) ABSTRACT

The present invention relates to a permanent magnet rotor comprising a rotary iron core formed by stacking a plurality of round steel plates, and a plurality of arc-shaped permanent magnets, wherein said individual arc-shaped permanent magnets of alternation poles are provided in the corresponding openings. In particular, the present invention discloses round-cornered permanent magnets by providing round instead of sharp corners at outer perimeter of two adjacent permanent magnets so as to form triangle-shaped regions. Moreover, to prevent said open areas from being filled up, portions of steel plates or holes through steel plates opposite said open areas are removed or created, respectively, so that magnetic flux leakage is minimized and motor performance is elevated.

8 Claims, 4 Drawing Sheets

MOTOR USING PERMANENT MAGNET ROTOR

FIELD OF THE INVENTION

The present invention relates to a permanent magnet rotor and in particular relates to a brushless silicon steel rotor using plug-in type arc-shaped permanent magnets, capable of reducing magnetic flux leakage.

BACKGROUND OF THE INVENTION

The direct current brushless rotor using plug-in type arc-shaped permanent magnets can usually be manufactured with relative ease. To improve space utilization, the gap between two magnets is reduced to the degree that the manufacturing process would allow, resulting in unwanted drawback of magnetic flux leakage. Usually, the shorter the gap, the more serious the magnetic flux leakage. The problems caused by magnetic flux leakage are two-folds: (1) decreasing effective torque and reducing motor efficiency and (2) increasing cogging torque and lowering start capability, as well as causing vibration and noise and comprising overall motor performance.

FIG. 1 shows a 3-dimensional perspective of a brushless permanent magnet direct current rotor 10 using plug-in type arc-shaped permanent magnets in accordance with an embodiment of the prior art, wherein a rotary iron core is formed by stacking a plurality of round steel plates 12, each steel plate 12 having, on its circumference, a plurality of arc-shaped openings 121. A plurality of arc-shaped permanent magnets of alternating poles is so arranged that each permanent magnet 13 be provided in a corresponding opening 121. Said round steel plates 12 are secured together to form a solid piece by pins, screw bolts or rivets through rivet holes 122. The outer perimeter corners of two adjacent permanent magnets 13, have the highest concentration of magnetic flux. As previously stated, when the outer perimeter corners of two adjacent permanent magnets 13, get too close, conventional permanent magnet rotor 10 as shown in FIG. 1 is prone to magnetic flux leakage. Such magnetic flux leakage affects motor efficiency and start capability, produces vibration and noise, and lowers overall motor performance.

Later inventions suggest round-cornered permanent magnets for improving permanent magnet rotor 20. As shown in FIG. 2, the quest for reduced magnetic flux leakage involves adopting round-cornered design for outer perimeter corners 231 of two adjacent permanent magnets 13 so as to create a near triangle-shaped region 24. Instead of leaving the triangle-shaped region 24 an open space, the individual round steel plate 22 now fills said region 24. Since round steel plates 22 are of magnetic material such as silicon steel, magnetic flux leakage remains a problem to be resolved.

U.S. Pat. No. 6,087,752 discloses a recessed steel plate design aimed for improving magnetic flux leakage in permanent magnet rotor. However, the permanent magnets are bar-shaped and being oriented in radial direction. The magnetic leakage problem continues as a result.

Prior arts, U.S. Pat. No. 5,581,140 and U.S. Pat. No. 4,954,736 are related prior arts with similar disadvantages shared by the embodiment of FIG. 2.

SUMMARY OF THE INVENTION

An object of the present invention is to provide a permanent magnet rotor structure using plug-in type arc-shaped permanent magnets, capable of reducing magnetic flux leakage and elevating overall motor performance.

To that end, the present invention reveals a permanent magnet rotor, comprising a rotary iron core formed by stacking a plurality of round steel plates, and a plurality of arc-shaped permanent magnets. Each round steel plate has, on its circumference, a plurality of individual arc-shaped openings separated from one another. A permanent magnet of suitable size and shape is provided in an arc-shaped opening. Said permanent magnets of alternating poles are so arranged that each permanent magnet be provided in a corresponding opening. The characteristics of the present invention include round-cornered design by removing sharp cornered areas in outer perimeter corners of two adjacent permanent magnets 13 so as to help form open triangle-shaped regions not fully occupied by solid steel plates, said open triangle-shaped regions being formed by removing portions of or creating holes in said steel plates. The magnetic flux is thus reduced and the motor efficiency elevated.

In one aspect of the present invention, said steel plates having portions removed are provided by creating v-shaped grooves on the outer wall of steel plates so that the tip of v-shaped grooves points the round-cornered areas.

In another aspect of the present invention, said steel plates having holes created are provided by generating triangle-shaped channels on the portions of steel plates opposite round-cornered areas.

In yet another aspect of the present invention, coordination of orientation for steel plates is achieved by marking the same depression on the same location of individual steel plates, each plate having a depression on one side and a corresponding elevation on the opposite side thereof, and stacking a plurality of said steel plates so that the depressions of individual steel plates fit one upon another.

The following Description and Designation of Drawings are provided in order to help understand the features and content of the present invention.

BRIEF DESCRIPTION OF THE DRAWINGS

The accompanying drawings form a material part of this description, in which.

DETAILED DESCRIPTION OF THE PREFERRED EMBODIMENT

The main feature of the present invention includes adopting round-cornered arc-shaped permanent magnets and removing portions of silicon steel plates in the vicinity between two adjacent permanent magnets in a direct current brushless rotor, comprising a rotary iron core being formed of by stacking a plurality of steel plates, and a plurality of arc-shaped permanent magnets, for reducing magnetic flux and improving motor performance.

Figure 1:
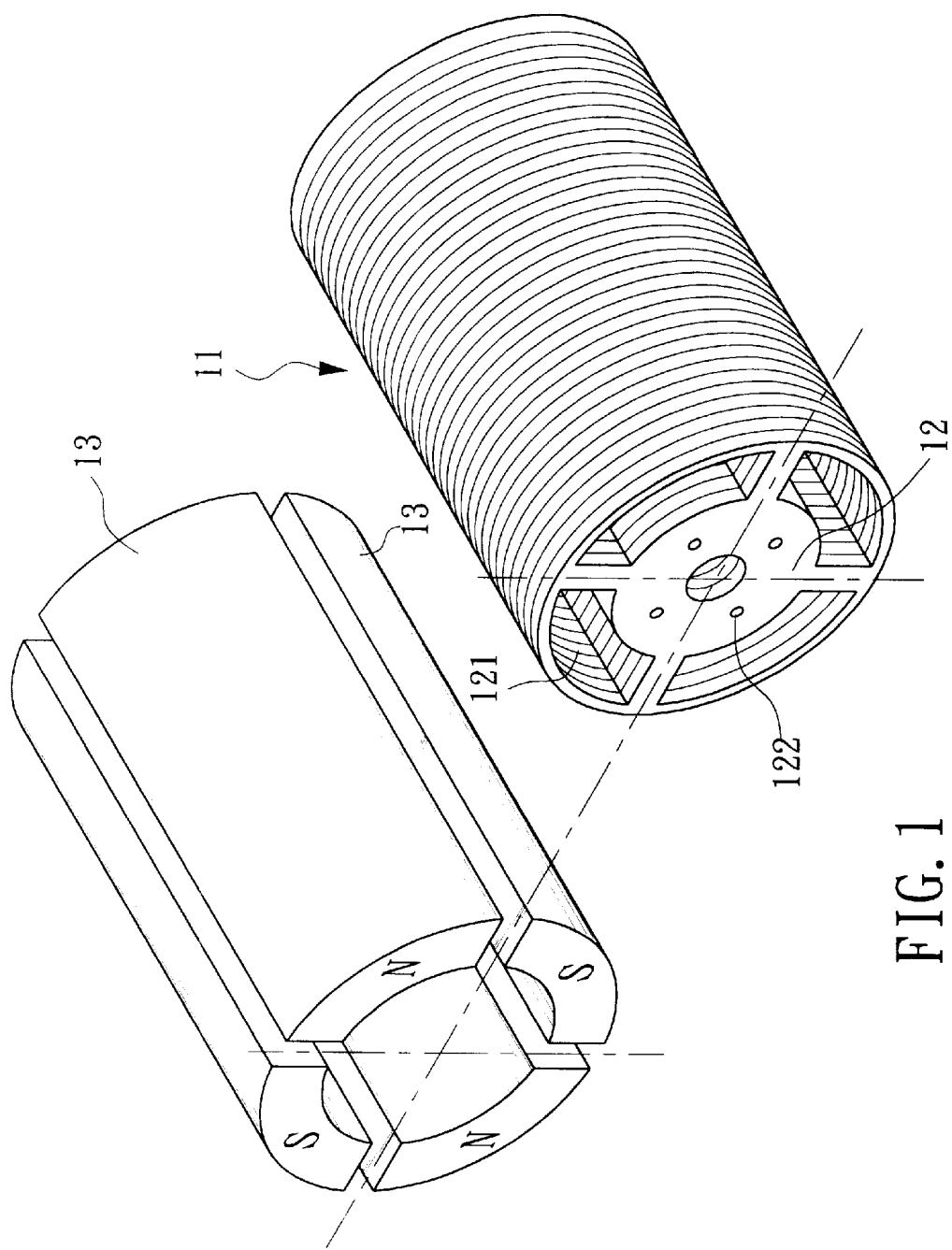
FIG. 1 is a 3-dimensional perspective of a brushless permanent magnet direct current rotor in accordance with an embodiment of the prior art.
Figure 2:
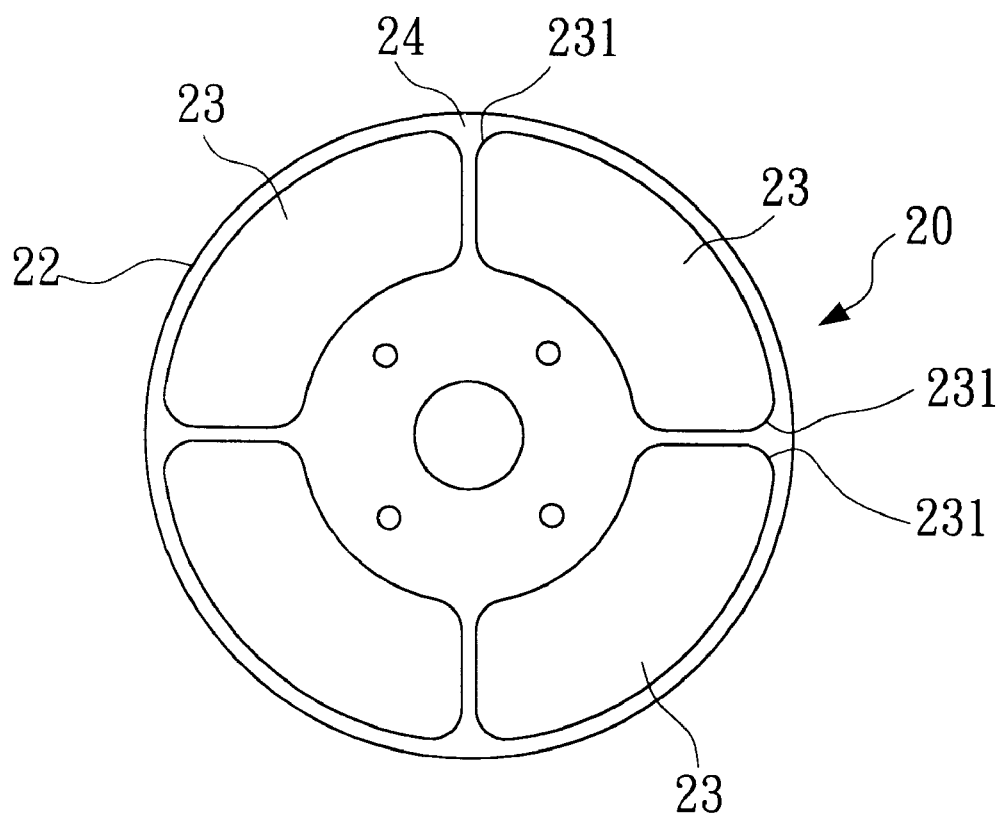
FIG. 2 is a 3-dimensional perspective of a brushless permanent magnet direct current rotor in accordance with another embodiment of the prior art.
Figure 3:
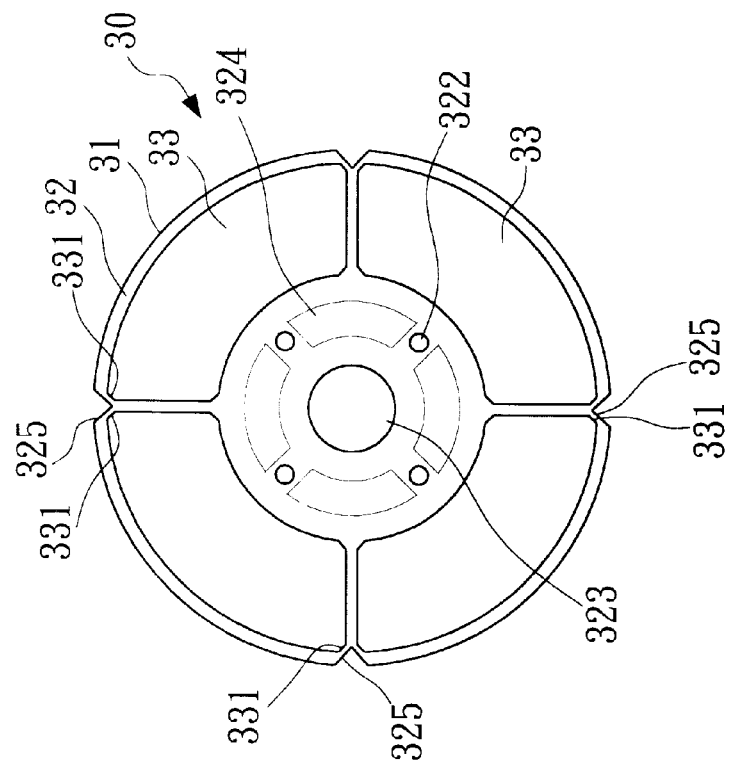
FIG. 3 is a structural perspective of a brushless permanent magnet direct current rotor in accordance with an embodiment of the present invention.

As shown in FIG. 3, the rotor 30 in a preferred embodiment of the present invention comprises a rotor iron core 31 and a plurality of elongated arc-shaped permanent magnets 33.

Said rotor iron core 31 includes a plurality of round-shaped thin steel plates 32 being stacked together, each steel plate 32 having a plurality of elongated arc-shaped openings provided thereon for accepting permanent magnets 33. Steel plates 32 in this embodiment are usually made of silicon steel material, particularly those stamp-fabricated, having excellent magnetic conductivity, although other magnetically conducting materials are suitable candidates as well. Individual steel plates, each having a plurality of elevations 322 on one side and a plurality of corresponding depressions on the opposite side thereof, are stacked one upon another with coincident depressions, so as to provide proper orientation. With a shaft hole 323 in the center, individual steel plates further include a plurality of narrow arc-shaped holes 324 circumferentially disposed in the area between said shaft hole 323 and said elongated arc-shaped openings (for accepting permanent magnets 33) for reducing rotor weight and cutting material cost.

Though six, eight or more are feasible, four said permanent magnet 33 of alternating poles and four said openings are arranged so that one each opening receives one each elongated arc-shaped magnet. Additionally, the outer perimeter areas 331 of two adjacent permanent magnets 33 have recessed round-corners for creating near triangle-shaped regions.

As shown in FIG. 3, properly sized and suitably v-shaped cutouts 325 are provided on individual steel plates 32 so that said near triangle-shaped regions are not fully occupied by solid steel plates 32. The removal of v-shaped cutouts in steel plates 32 is capable of preventing magnetic flux leakage by raising magnetic impedance in the near triangle-shaped regions, thus elevating overall motor performance.

In other embodiments presented in the following, identical or similar components are represented by same names without repeated description since most components are identical or similar to those utilized in the aforementioned embodiment.

Figure 4:
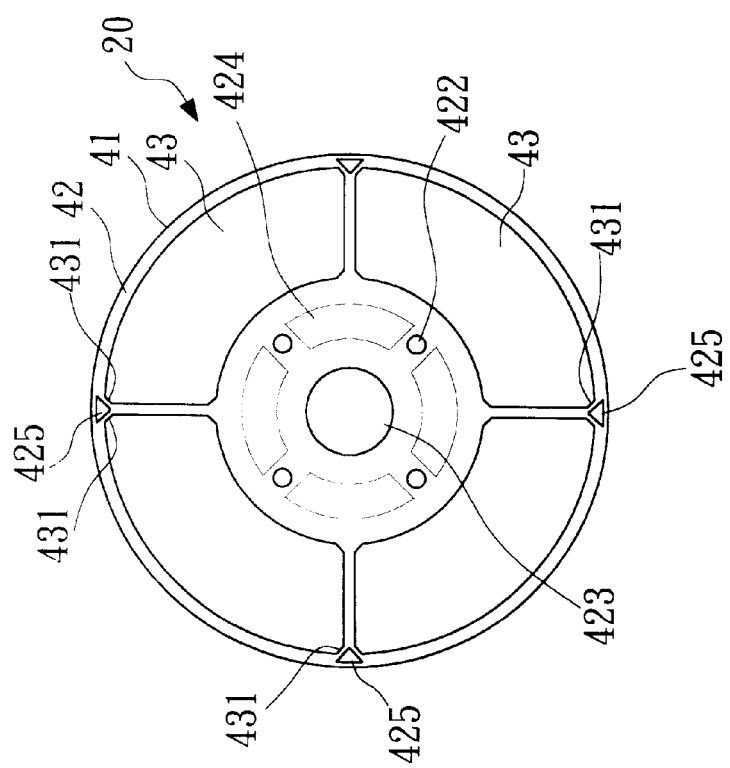
FIG. 4 is a structural perspective of a brushless permanent magnet direct current rotor in accordance with another embodiment of the present invention.

As shown in FIG. 4, the permanent magnet rotor 40 in a preferred embodiment of the present invention comprises a rotor iron core 41 and four elongated arc-shaped permanent magnets 43.

As shown in FIG. 4, the rotor 40 in a preferred embodiment of the present invention comprises a rotor iron core 41 and four elongated arc-shaped permanent magnet 43.

Said rotor iron core 41 includes a plurality of round-shaped thin steel plates 42 being stacked together, each steel plate 42 having four elongated arc-shaped openings for accepting permanent magnets 43, a shaft hole 423, four narrow arc-shaped holes 424, as well as elevations 422 on one side and corresponding depressions on the opposite side thereof. Furthermore, the round-cornered design is adopted for outer perimeter corners 431 of two adjacent permanent magnets 43 so as to allow room for creating triangle-shaped regions.

Being different from the preferred embodiment as shown in FIG. 3, the preferred embodiment as shown in FIG. 4, suggests instead that a v-shaped cutout 425 be removed from individual steel plates 42 so that near triangle-shaped regions are not fully occupied by solid steel plate 32. By the same token, the v-shaped cutouts 425 are capable of preventing magnetic flux leakage by increasing magnetic impedance in the near triangle-shaped regions, thereby elevating overall motor performance.

Figure 5:
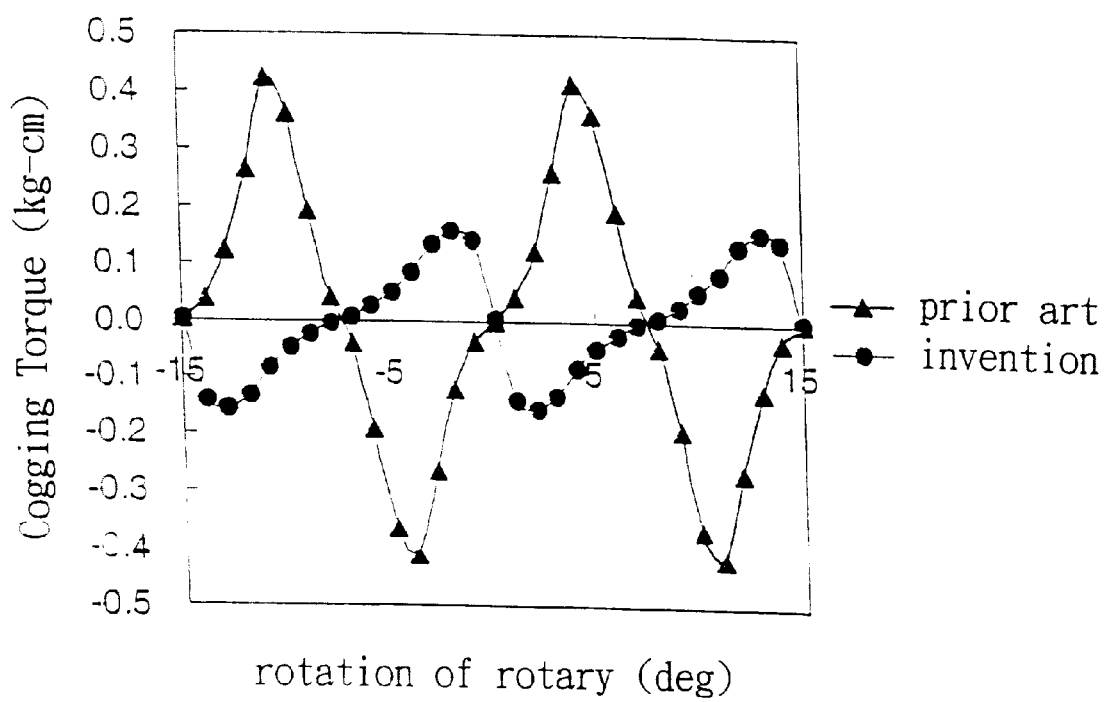
FIG. 5 compares the simulated test results of cogging torque generated by permanent magnet rotors between the present invention and the prior art.

A comparative graph as shown in FIG. 5 compares the simulated test results of cogging torque generated by permanent magnet rotors between the present invention and the prior art. The test results indicate that providing v-shaped grooves or triangular-shaped open channels in accordance with the respective embodiment of the present invention reduces magnetic flux. The present invention is capable of lowering the cogging torque by as much as 62% when compared with the test results provided by the prior art. Hence, in the present invention, the motor efficiency is raised, vibration and noises are lowered, and overall motor performance is elevated.

While we have shown and described several embodiments in accordance with the present invention, it is understood that the same is not limited thereto, but is susceptible to numerous changes and modifications as is known in the art; and we therefore do not wish to be limited to the details shown and described herein, but intend to cover all such modifications as are encompassed by the scope of the appended claims.

What is claimed is:

1. A permanent magnet rotor comprising:
   a) a rotor iron core including a plurality of circular steel plates stacked one upon the other, the iron core including: a periphery; a plurality of arcuate openings located inwardly of the periphery, each arcuate opening having rounded corners so as to form areas having generally triangular cross-sections between adjacent arcuate openings and the periphery; a central shaft hole; a plurality of vacant, arcuate holes located between inner boundaries of the plurality of arcuate openings and the central shaft hole, the arcuate holes being circumferentially displaced from the arcuate openings; and a plurality of V-shaped cutouts located in the generally triangular areas and each extending inwardly from the periphery to a location between adjacent arcuate openings; and,
   b) an arcuate shaped permanent magnet located in each arcuate opening, adjacent magnets having opposite polarities, each magnet having outer rounded corners and filling each of the arcuate openings,
      whereby the V-shaped cutouts prevent magnetic flux leakage by raising magnetic impedance in the generally triangular areas.

2. The permanent magnet rotor of claim 1, wherein said steel plates are silicon steel plates.

3. The permanent magnet rotor of claim 1, wherein a total of four permanent magnets and four steel plates are provided.

4. The permanent magnet rotor of claim 1, wherein coordination of orientation for said steel plates is achieved by providing elevations on one side of each of the steel plates and stacking the plurality of steel plates so that the elevations of individual steel plates fit one upon another.

5. A permanent magnet rotor comprising:
   a) a rotor iron core including a plurality of circular steel plates stacked one upon the other, the iron core including: a periphery; a plurality of arcuate openings located inwardly of the periphery, each arcuate opening having rounded corners so as to form areas having generally triangular cross-sections between adjacent arcuate openings and the periphery; a central shaft hole; a plurality of vacant, arcuate holes located between inner boundaries of the plurality of arcuate openings and the central shaft hole, the arcuate holes being circumferentially displaced from the arcuate openings; and a plurality of triangular-shaped channels located in the generally triangular areas and each extending inwardly to a location between adjacent arcuate openings; and,
   b) an arcuate shaped permanent magnet located in each arcuate opening, adjacent magnets having opposite polarities, each magnet having outer rounded corners and filling each of the arcuate openings,
      whereby the triangular-shaped channels prevent magnetic flux leakage by raising magnetic impedance in the generally triangular areas.

6. The permanent magnet rotor of claim 5, wherein said steel plates are silicon steel plates.

7. The permanent magnet rotor of claim 5, wherein a total of four permanent magnets and four steel plates are provided.

8. The permanent magnet rotor of claim 5, wherein coordination of orientation for said steel plates is achieved by providing elevations on one side of each of the steel plates and stacking the plurality of steel plates so that the elevations of individual steel plates fit one upon another.

* * * * *